(12) United States Patent
Hirai et al.

(10) Patent No.: US 12,695,343 B2
(45) Date of Patent: Jul. 28, 2026

(54) ROTOR AND ROTATING ELECTRIC MACHINE

(71) Applicant: Mitsubishi Electric Corporation, Tokyo (JP)

(72) Inventors: Yu Hirai, Tokyo (JP); Junji Kitao, Tokyo (JP); Tatsuo Nishimura, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 173 days.

(21) Appl. No.: 18/571,260

(22) PCT Filed: Aug. 23, 2021

(86) PCT No.: PCT/JP2021/030767
§ 371 (c)(1),
(2) Date: Dec. 18, 2023

(87) PCT Pub. No.: WO2023/026319
PCT Pub. Date: Mar. 2, 2023

(65) Prior Publication Data
US 2024/0283310 A1      Aug. 22, 2024

(51) Int. Cl.
*H02K 1/276* (2022.01)
*H02K 11/01* (2016.01)

(52) U.S. Cl.
CPC ......... *H02K 1/2766* (2013.01); *H02K 11/012* (2020.08)

(58) Field of Classification Search
CPC ............ H02K 1/22; H02K 1/27; H02K 1/276; H02K 1/2766; H02K 11/012; Y02T 10/64
(Continued)

(56) References Cited

U.S. PATENT DOCUMENTS 6,300,703 B1 * 10/2001 Kawano ................. H02K 1/246
                                                          310/168
6,815,859 B2 * 11/2004 Sakuma ................. H02K 21/14
                                                          310/156.53
(Continued)

FOREIGN PATENT DOCUMENTS

JP         2005-198487 A      7/2005
JP          5259927 B2        8/2013
(Continued)

OTHER PUBLICATIONS

International Search Report and Written Opinion mailed on Oct. 26, 2021, received for PCT Application PCT/JP2021/030767, filed on Aug. 23, 2021, 8 pages including English Translation.

*Primary Examiner* — Alex W Mok
(74) *Attorney, Agent, or Firm* — XSENSUS LLP

(57) ABSTRACT

Provided is a rotor that enables reduction in iron loss due to harmonics. One magnetic pole is formed by arranging three or more magnetic-pole layers each having a pair of V-shaped magnet slots and permanent magnets. An angle between a q axis and a line parallel to a magnetic-flux output surface of the permanent magnet is defined as a magnetic-pole-layer angle. The magnetic-pole-layer angles in one magnetic pole become smaller as the magnetic-pole layers become closer to a rotary shaft. A shortest distance from the magnet slot to the outer circumferential surface of a rotor core is defined as a bridge width and a shortest distance between the adjacent magnetic-pole layers is defined as a magnetic-pole-layer interval. The magnetic-pole-layer interval is set to be smaller than a sum of the bridge widths of the adjacent magnetic-pole layers.

7 Claims, 12 Drawing Sheets

(58) Field of Classification Search
     USPC .................................................... 310/156.53
     See application file for complete search history.

(56)                        References Cited

U.S. PATENT DOCUMENTS

| | | | | |
|---|---|---|---|---|
| 7,504,754 B2 * | 3/2009 | Jahns | ..................... | H02K 21/14 |
| | | | | 310/156.53 |
| 7,902,710 B2 * | 3/2011 | Han | ..................... | H02K 1/2766 |
| | | | | 310/156.56 |
| 8,089,190 B2 * | 1/2012 | Lee | ........................ | H02K 1/276 |
| | | | | 310/156.53 |
| 2003/0102755 A1 * | 6/2003 | Naito | ................... | H02K 1/2766 |
| | | | | 310/156.56 |
| 2005/0140236 A1 | 6/2005 | Jeong et al. | | |
| 2018/0145552 A1 * | 5/2018 | Hattori | ................ | H02K 1/2766 |

FOREIGN PATENT DOCUMENTS

| | | | |
|---|---|---|---|
| JP | 5353962 | B2 | 11/2013 |
| JP | 2019-187200 | A | 10/2019 |
| JP | 2021-035160 | A | 3/2021 |

* cited by examiner

FIG.2

ROTOR AND ROTATING ELECTRIC MACHINE

CROSS-REFERENCE TO RELATED APPLICATION

This application is based on PCT filing PCT/JP2021/030767, filed Aug. 23, 2021, the entire contents of which are incorporated herein by reference.

TECHNICAL FIELD

The present disclosure relates to a rotor and a rotating electric machine.

BACKGROUND ART

As a conventional permanent-magnet-type rotating electric machine, there is known a rotating electric machine that has a first magnet slot provided along the outer circumference of a rotor and second and third magnet slots having V shapes and provided in multiple layers on the radially inner side of the first magnet slot. In this rotating electric machine, permanent magnets are inserted in the magnet slots, to form one magnetic pole (see, for example, Patent Document 1).

CITATION LIST

Patent Document

Patent Document 1: Japanese Patent No. 5353962

SUMMARY OF THE INVENTION

Problem to be Solved by the Invention

In the conventional rotating electric machine, a width between magnetic poles adjacent to each other across the q axis is set to be greater than a width between magnet slots in one magnetic pole, in order to increase reluctance torque. However, if the width between the magnetic poles adjacent to each other across the q axis is increased, variation in a magnetic flux density generated in a gap between a stator and the rotor becomes sharp at a q-axis part, thus causing a problem that iron loss due to harmonics increases. In addition, when magnet slots are merely formed in multiple layers as in the conventional rotating electric machine, the waveform of the magnetic flux density generated in the gap becomes close to a rectangular wave containing many harmonic components, thus causing a problem that iron loss due to harmonics increases when d-axis current flows.

The present disclosure has been made to solve the above problem, and an object of the present disclosure is to provide a rotor in which iron loss due to harmonics is reduced.

Means to Solve the Problem

A rotor according to the present disclosure includes a rotor core and a plurality of permanent magnets, the rotor being configured to rotate about a rotary shaft. In a cross-section perpendicular to the rotary shaft, one magnetic pole is formed by three or more magnetic-pole layers being arranged, each magnetic-pole layer being formed by a pair of magnet slots in a V shape opened radially outward from a center of the rotary shaft and the permanent magnets inserted in the magnet slots. Each magnet slot has a magnet insertion portion in which the permanent magnet is inserted and flux barriers formed at both ends of the magnet insertion portion. Where a magnetic pole center of the one magnetic pole is defined as a d axis, a direction electrically perpendicular to the d axis is defined as a q axis, and an angle on the rotary shaft side between the q axis and a line parallel to a magnetic-flux output surface of the permanent magnet inserted in the magnet slot in each magnetic-pole layer is defined as a magnetic-pole-layer angle, the magnetic-pole-layer angles in the one magnetic pole become smaller as the magnetic-pole layers become closer to the rotary shaft. Where a shortest distance from the flux barrier on a radially outer side of the magnet slot to an outer circumferential surface of the rotor core is defined as a bridge width and a shortest distance between the magnetic-pole layers adjacent to each other is defined as a magnetic-pole-layer interval, the magnetic-pole-layer interval is smaller than a sum of the bridge widths of the magnetic-pole layers adjacent to each other.

Effect of the Invention

In the rotor according to the present disclosure, the magnetic-pole-layer angles in one magnetic pole become smaller as the magnetic-pole layers become closer to the rotary shaft, and the magnetic-pole-layer interval is smaller than the sum of the bridge widths of the magnetic-pole layers adjacent to each other. Thus, iron loss due to harmonics can be reduced.

BRIEF DESCRIPTION OF THE DRAWINGS

FIG. 2 is a cross sectional view of the rotating electric machine according to embodiment 1.

DESCRIPTION OF EMBODIMENTS

Figure 1:
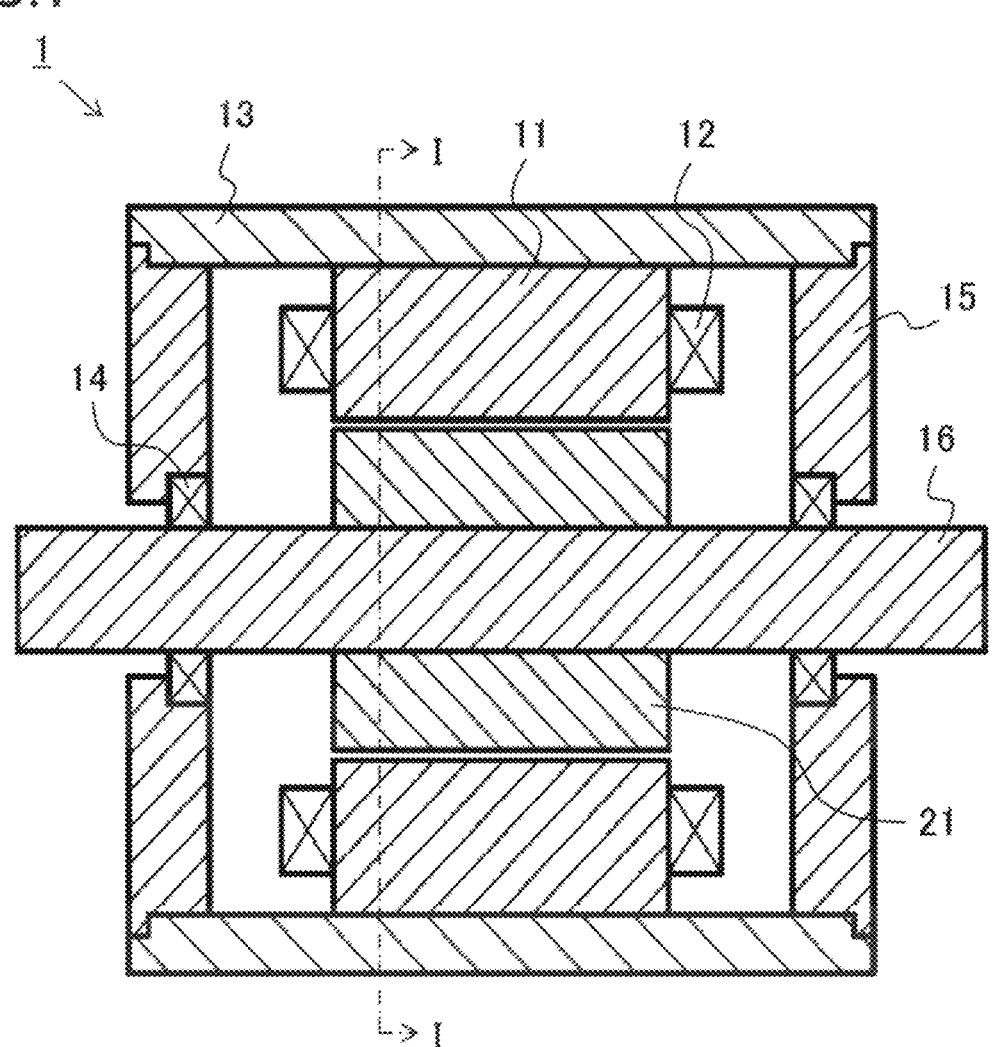
FIG. 1 is a vertical sectional view of a rotating electric machine according to embodiment 1.

Hereinafter, a rotor and a rotating electric machine according to embodiments for carrying out the present disclosure will be described in detail with reference to the drawings. In the drawings, the same reference characters denote the same or corresponding parts.

Embodiment 1

Figure 2:
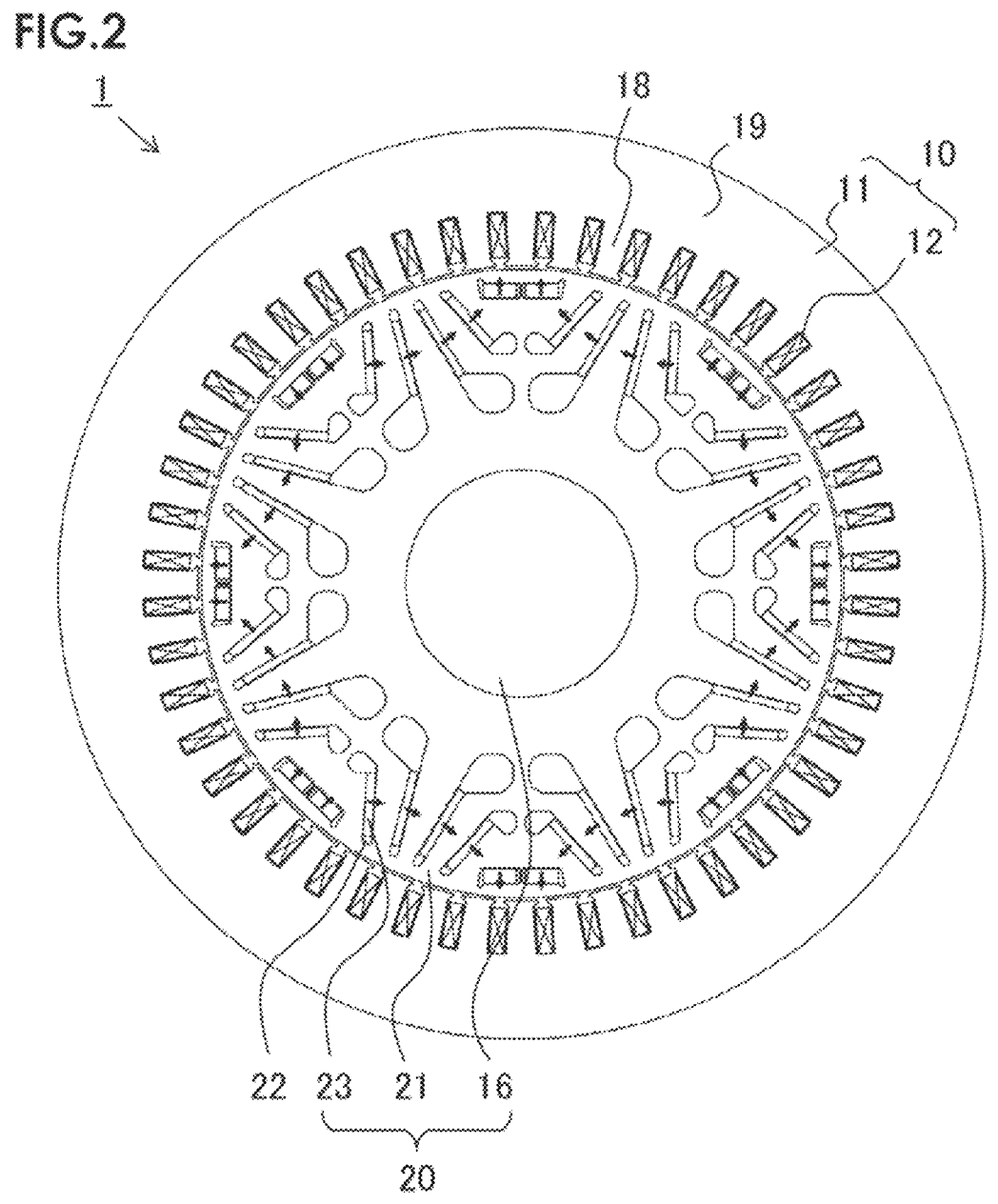

FIG. 1 is a vertical sectional view of a rotating electric machine according to embodiment 1. FIG. 2 is a cross sectional view along plane I-I in FIG. 1. FIG. 1 is a sectional view along a plane parallel to a rotary shaft of the rotating electric machine. FIG. 2 is a sectional view along a plane perpendicular to the rotary shaft of the rotating electric machine. Hereinafter, a direction parallel to the rotary shaft is referred to as an axial direction, a direction perpendicular to the rotary shaft is referred to as a radial direction, and a direction of rotation about the rotary shaft is referred to as a circumferential direction.

As shown in FIG. 1, a rotating electric machine 1 of the present embodiment includes a cylindrical frame 13, bearings 14, a pair of brackets 15, and a rotary shaft 16. The pair of brackets 15 are attached at both ends in the axial direction of the frame 13, to close openings at both ends in the axial direction of the frame 13. The bearings 14 are attached to the pair of brackets 15. The rotary shaft 16 is supported by the bearings 14 and provided rotatably in the frame 13. Further, the rotating electric machine 1 includes a rotor core 21 fixed to the rotary shaft 16, and a stator core 11 provided on the outer circumferential side of the rotor core 21 coaxially with the rotor core 21. The stator core 11 is fixed to the frame 13. A gap is formed between the rotor core 21 and the stator core 11 provided coaxially with each other.

As shown in FIG. 2, a stator 10 includes the annular stator core 11 and a stator coil 12 attached to the stator core 11. The stator core 11 includes an annular core back 19 and a plurality of teeth 18 protruding radially inward from the inner circumferential surface of the core back 19. Forty-eight teeth 18 are arranged at an equiangular pitch in the circumferential direction. The stator core 11 is formed by stacking electromagnetic steel sheets in the rotary shaft direction, for example. The stator coil 12 is formed by a conductive wire wound around the teeth 18 through spaces between the teeth 18. In the present embodiment, the stator coil 12 is formed by distributed winding so as to be wound across a plurality of teeth 18.

As shown in FIG. 2, a rotor 20 includes the rotary shaft 16, the annular rotor core 21, and forty-eight permanent magnets 23 inserted in forty-eight magnet slots 22 formed in the rotor core 21. The rotor core 21 is formed by stacking electromagnetic steel sheets in the rotary shaft direction, for example. The rotor core 21 is fixed to the rotary shaft 16 inserted in a shaft insertion hole. The rotor 20 is rotatably provided in the frame 13 by being supported through the rotary shaft 16 via the bearings 14. In FIG. 2, arrows indicate directions of a magnetic flux extending from an S pole to an N pole of the permanent magnets.

Figure 3:
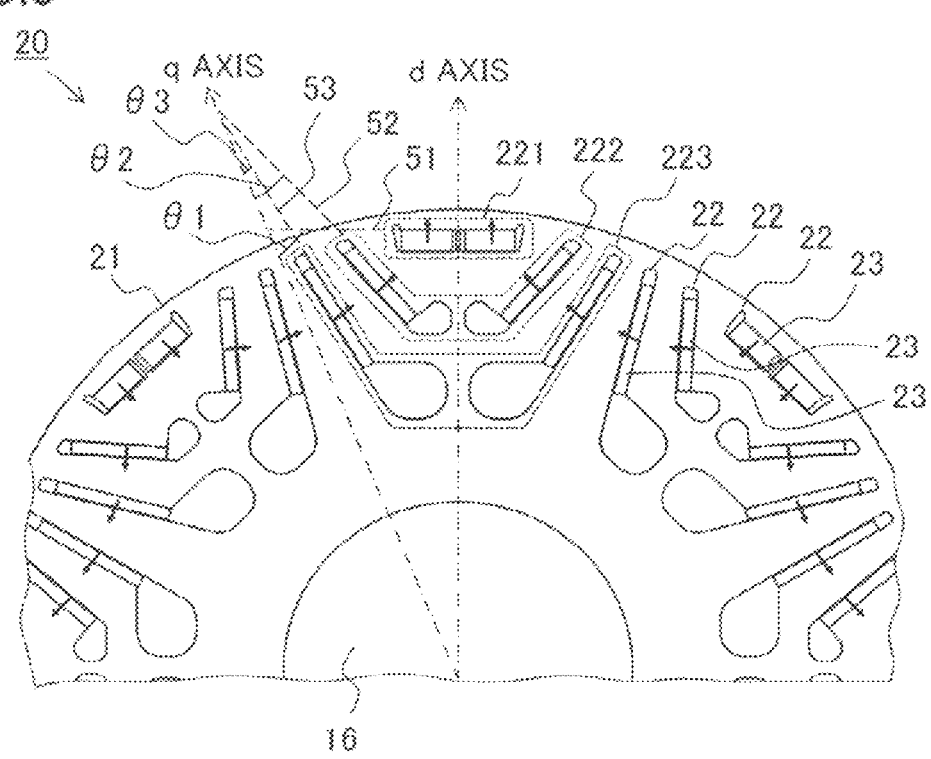
FIG. 3 is an enlarged sectional view of a rotor according to embodiment 1.

FIG. 3 is an enlarged sectional view of the rotor according to the present embodiment. FIG. 3 is a sectional view along a plane perpendicular to the rotary shaft. In the rotor core 21 in the present embodiment, pairs of magnet slots 22 in V shapes that open radially outward from the center of the rotary shaft are formed in three layers arranged along the d axis. Each magnet slot 22 has a magnet insertion portion in which the permanent magnet 23 is inserted and flux barriers formed at both ends of the magnet insertion portion. The flux barrier is formed by, for example, a void, so as to have a lower permeability than the rotor core 21. In each magnet slot, the flux barrier on the radially outer side is referred to as a gap-side flux barrier, and the flux barrier on the radially inner side is referred to as a d-axis-side flux barrier. Here, a pair of magnet slots 22 and two permanent magnets 23 inserted in the magnet slots 22 are collectively referred to as a magnetic-pole layer. In the rotor in the present embodiment, one magnetic pole is formed by three layers which are a magnetic-pole layer 221 at the farthest position from the rotary shaft, a magnetic-pole layer 222 located on the rotary shaft side of the magnetic-pole layer 221, and a magnetic-pole layer 223 located on the rotary shaft side of the magnetic-pole layer 222. In the present embodiment, a pair of magnet slots 22 in the magnetic-pole layer 221 have a V shape with an opening angle of 180°. Here, a magnetic pole center of the N pole of the permanent magnets forming one magnetic pole is defined as a d axis, and a direction located between the magnetic poles and electrically perpendicular to the d axis is defined as a q axis.

In FIG. 3, a line parallel to a magnetic-flux output surface of the permanent magnet 23 in the magnetic-pole layer 221 is defined as a line 51. A line parallel to a magnetic-flux output surface of the permanent magnet 23 in the magnetic-pole layer 222 is defined as a line 52. A line parallel to a magnetic-flux output surface of the permanent magnet 23 in the magnetic-pole layer 223 is defined as a line 53. Then, an angle on the rotary shaft side between the q axis and the line 51 is defined as a magnetic-pole-layer angle 61, an angle on the rotary shaft side between the q axis and the line 52 is defined as a magnetic-pole-layer angle $\theta 2$, and an angle on the rotary shaft side between the q axis and the line 53 is defined as a magnetic-pole-layer angle $\theta 3$. The rotor 20 in the present embodiment is configured so as to satisfy a relationship of $\theta 1 > \theta 2 > \theta 3$. In other words, the magnetic-pole-layer angles in one magnetic pole are set so as to become smaller as the magnetic-pole layers become closer to the rotary shaft.

Figure 4:
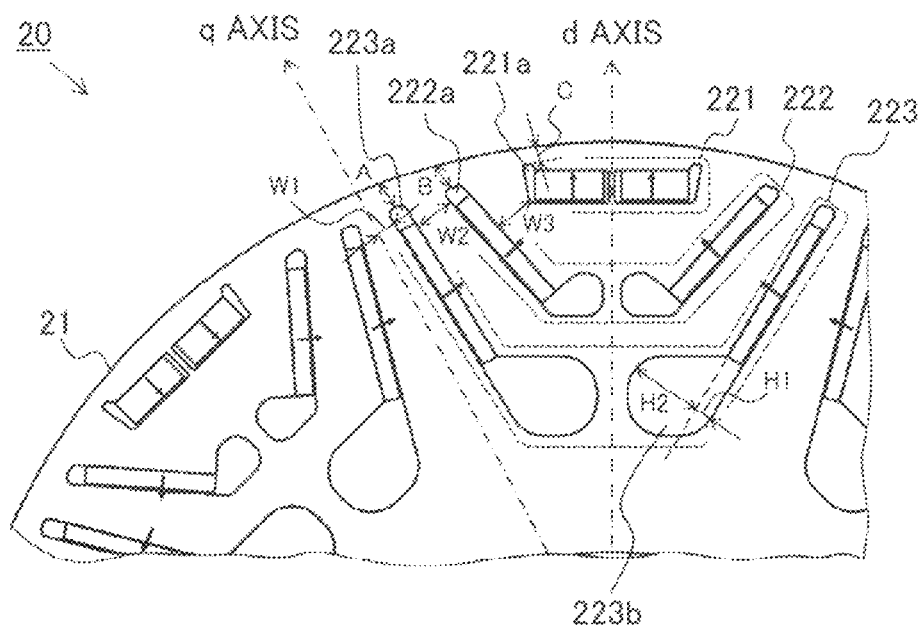
FIG. 4 is an enlarged sectional view of the rotor according to embodiment 1.

FIG. 4 is an enlarged sectional view of the rotor according to the present embodiment. FIG. 4 is a sectional view more enlarged than in FIG. 3. In FIG. 4, a part between the gap-side flux barrier in each magnetic-pole layer and the outer circumferential surface of the rotor core 21 is referred to as a bridge. Then, the shortest distance between a gap-side flux barrier 221a in the magnetic-pole layer 221 and the outer circumferential surface of the rotor core 21 is defined as a bridge width C, the shortest distance between a gap-side flux barrier 222a in the magnetic-pole layer 222 and the outer circumferential surface of the rotor core 21 is defined as a bridge width B, and the shortest distance between a gap-side flux barrier 223a in the magnetic-pole layer 223 and the outer circumferential surface of the rotor core 21 is defined as a bridge width A. In addition, the shortest distance between the magnetic-pole layer 221 and the magnetic-pole layer 222 is defined as a magnetic-pole-layer interval W3, the shortest distance between the magnetic-pole layer 222 and the magnetic-pole layer 223 is defined as a magnetic-pole-layer interval W2, and the shortest distance between the magnetic-pole layer 223 and the q axis is defined as a magnetic-pole-layer interval W1. The rotor 20 in the present embodiment is configured so as to satisfy a relationship of B+C>W3, A+B>W2, and 2×A>2×W1. More specifically, the magnetic-pole-layer interval W3 between the magnetic-pole layer 221 and the magnetic-pole layer 222 is set to be smaller than the sum of the bridge width C of the magnetic-pole layer 221 and the bridge width B of the magnetic-pole layer 222. In addition, the magnetic-pole-layer interval W2 between the magnetic-pole layer 222 and the magnetic-pole layer 223 is set to be smaller than the sum of the bridge width B of the magnetic-pole layer 222 and the bridge width A of the magnetic-pole layer 223. Further, a magnetic-pole-layer interval 2×W1 between the magnetic-pole layer 223 and the magnetic-pole layer 223 of the adjacent magnetic pole is set to be smaller than the sum of the bridge width A of the magnetic-pole layer 223 and the bridge width A of the magnetic-pole layer 223 of the adjacent magnetic pole. In other words, the magnetic-pole-layer interval is set to be smaller than the sum of the bridge widths of the magnetic-pole layers adjacent to each other.

In the present embodiment, the relationship of $\theta 1 > \theta 2 > \theta 3$ is represented as a condition 1, and the relationship of B+C>W3, A+B>W2, and 2×A>2×W1 is represented as a condition 2.

Figure 5:
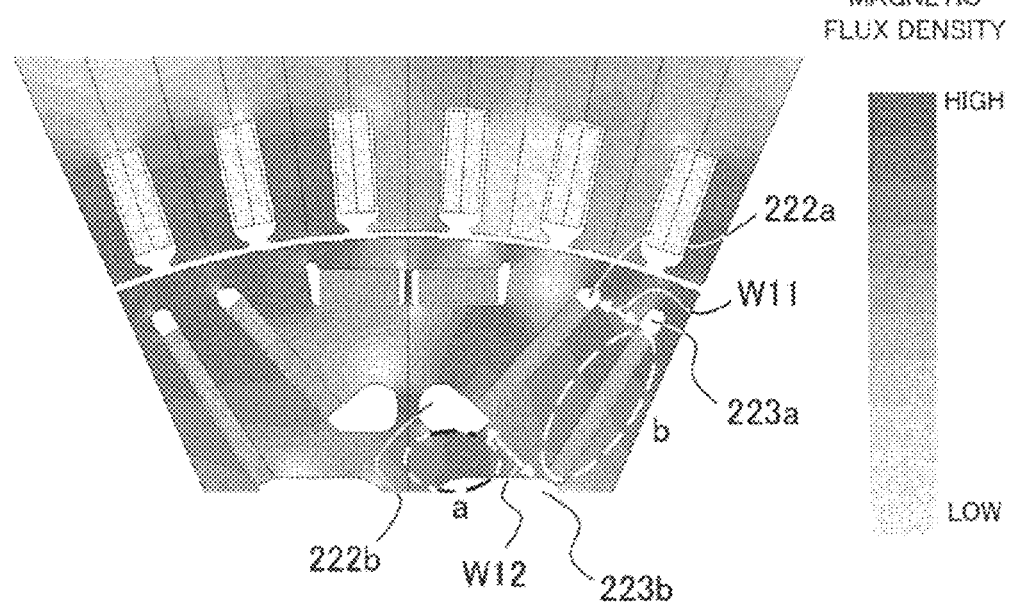
FIG. 5 is a contour diagram of a magnetic flux density in a rotating electric machine in Example 1 according to embodiment 1.
Figure 6:
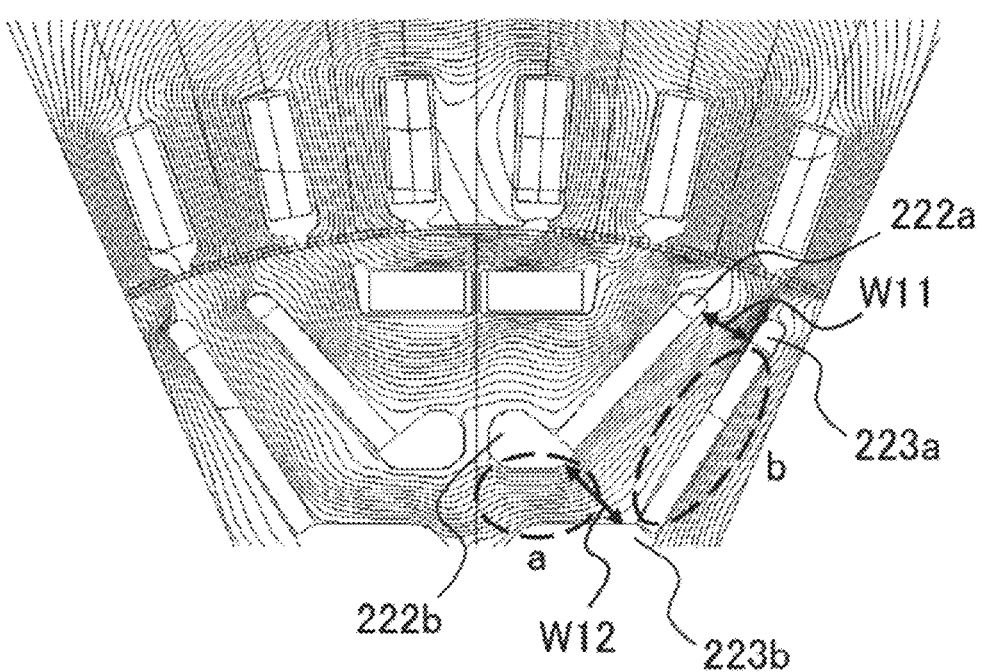
FIG. 6 shows magnetic flux lines in the rotating electric machine in Example 1 according to embodiment 1.

Next, effects when q-axis current flows in the rotating electric machine of the present embodiment will be described using Example 1 and Comparative example 1. FIG. 5 is a contour diagram of a magnetic flux density when q-axis current flows in the rotating electric machine in Example 1 according to the present embodiment. FIG. 6 shows magnetic flux lines in the rotating electric machine in Example 1. FIG. 6 shows magnetic flux lines of an armature magnetic flux obtained by magnetic flux separation between the armature magnetic flux and a magnet magnetic flux from the magnetic flux density shown in FIG. 5, using frozen permeability. Here, frozen permeability is one of magnetic field analysis methods used for a rotating electric machine driven by two magnetomotive force sources which are armature current and a permanent magnet as in a permanent magnet synchronous rotating electric machine. This magnetic field analysis method can decompose a magnetic flux density distribution into those based on two magnetomotive force sources, considering a nonlinear magnetization characteristic.

FIG. 5 and FIG. 6 show results of simulations using a magnetic field analysis program. Parameters in Example 1 used in the simulation are as follows. Values regarding the condition 1 were $\theta 1=67.5°$, $\theta 2=18.5°$, and $\theta 3=8.3°$. Values regarding the condition 2 were A=3.25 mm, B=3.0 mm, C=1.9 mm, W1=2.0 mm, W2=4.5 mm, and W3=4.6 mm. Thus, in Example 1, $\theta 1 > \theta 2 > \theta 3$ is satisfied, i.e., the condition 1 is satisfied, and B+C>W3, A+B>W2, and 2×A>2×W1 are satisfied, i.e., the condition 2 is also satisfied.

Figures 7, 8:
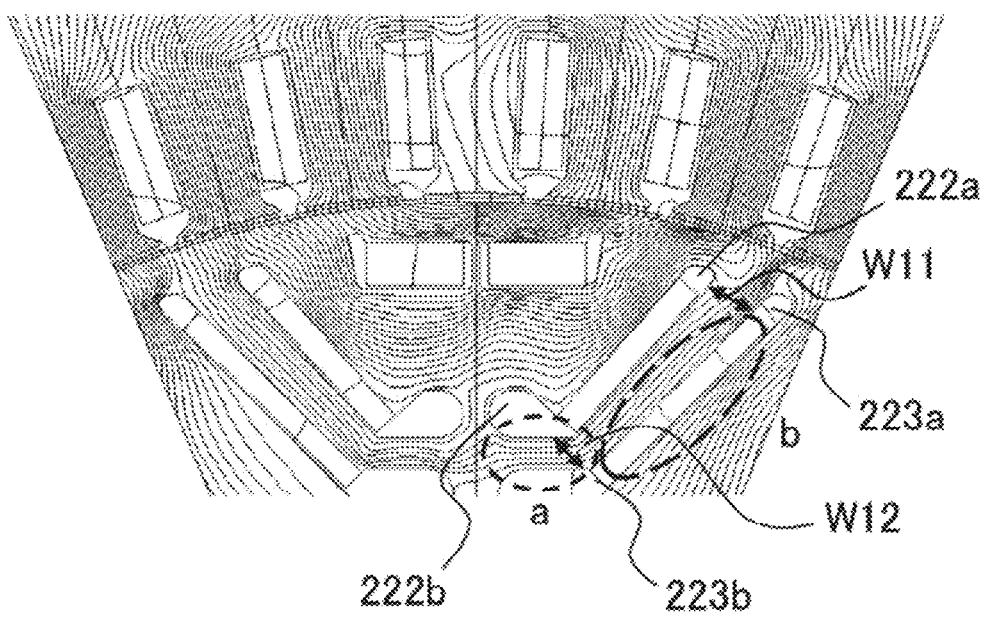
FIG. 7 is a contour diagram of a magnetic flux density in a rotating electric machine in Comparative example 1 according to embodiment 1.
FIG. 8 shows magnetic flux lines in the rotating electric machine in Comparative example 1 according to embodiment 1.

FIG. 7 is a contour diagram of a magnetic flux density when q-axis current flows in the rotating electric machine in Comparative example 1 according to the present embodiment. FIG. 8 shows magnetic flux lines in the rotating electric machine in Comparative example 1. FIG. 8 shows magnetic flux lines of an armature magnetic flux obtained by magnetic flux separation between the armature magnetic flux and a magnet magnetic flux from the magnetic flux density shown in FIG. 7, using frozen permeability. FIG. 7 and FIG. 8 show results of simulations using the magnetic field analysis program. Parameters in Comparative example 1 used in the simulation are as follows. Values regarding the condition 1 were $\theta 1=67.5°$, $\theta 2=18.5°$, and $\theta 3=22.5°$. Values regarding the condition 2 were A=3.25 mm, B=3.0 mm, C=1.9 mm, W1=2.0 mm, W2=4.5 mm, and W3=4.6 mm. Thus, in Comparative example 1, $\theta 1 > \theta 2 < \theta 3$ is satisfied, i.e., the condition 1 is not satisfied, but B+C>W3, A+B>W2, and 2×A>2×W1 are satisfied, i.e., the condition 2 is satisfied.

In FIG. 5 to FIG. 8, a width between the gap-side flux barrier 222a in the magnetic-pole layer 222 and the gap-side flux barrier 223a in the magnetic-pole layer 223 is defined as W11, and a width between a d-axis-side flux barrier 222b in the magnetic-pole layer 222 and a d-axis-side flux barrier 223b in the magnetic-pole layer 223 is defined as W12. In addition, in FIG. 5 to FIG. 8, an area between the d-axis-side flux barrier 222b in the magnetic-pole layer 222 and the d-axis-side flux barrier 223b in the magnetic-pole layer 223 is defined as a specific part a, and an area where the permanent magnet 23 is placed in the magnetic-pole layer 223 is defined as a specific part b.

Comparing the magnetic flux density in the specific part a in Example 1 shown in FIG. 5 and the magnetic flux density in the specific part a in Comparative example 1 shown in FIG. 7, it is found that the magnetic flux density in Example 1 is smaller than the magnetic flux density in Comparative example 1. This relationship is due to a relationship between the width W11 and the width W12. In Example 1 shown in FIG. 5, W11<W12 is satisfied, but in Comparative example 1 shown in FIG. 7, W11>W12 is satisfied. The reason why W11<W12 is satisfied in Example 1 is that the condition 1 of $\theta 1 > \theta 2 > \theta 3$ is satisfied. In contrast, in Comparative example 1, $\theta 2 < \theta 3$ is satisfied, so that the condition 1 is not satisfied, resulting in W11>W12.

In Example 1, since W12 is great and the magnetic flux density in the specific part a is small, an armature magnetic flux flowing from a W11 area to a W12 area readily flows to the specific part a. On the other hand, in Comparative example 1, since W12 is small and the magnetic flux density in the specific part a is great, an armature magnetic flux flowing from a W11 area to a W12 area hardly flows to the specific part a and partially flows to the specific part b. In the specific part b, comparing a magnetic flux interlinked with the permanent magnet between FIG. 6 and FIG. 8, it is found that the interlinked magnetic flux is greater in Comparative example 1 than in Example 1. The magnetic flux interlinked with the permanent magnet leads to reduction in efficiency and temperature increase in the permanent magnet. That is, in order to reduce the magnetic flux interlinked with the permanent magnet, it is necessary to satisfy θ1>82>θ3 which is the condition 1.

In a rotating electric machine, it is known that loss due to harmonics can be reduced when a magnetic flux generated in a gap between a stator and a rotor is made into a sinewave. The magnetic flux generated in the gap can be calculated by multiplication of the magnetomotive force and the permeability, and the generated magnetic flux can be made into a sinewave by making both of the magnetomotive force and the permeability into sine waveforms. Here, the magnetomotive force is determined by the armature magnetic flux of the stator and the magnet magnetic flux of the rotor, and the permeability is determined by permeability distributions at the stator and the rotor. In a magnetomotive force waveform and a permeability distribution of a distributed-winding stator, harmonic components due to slots and the like are present, but the harmonic components are high-order components and the values thereof are small, so that the influence thereof on harmonic loss is small. In a case of a general interior permanent magnet synchronous motor (hereinafter, referred to as IPMSM), a magnetomotive force waveform and a permeability distribution of a rotor have waveforms like a rectangular wave and contain low-order harmonic components having great values. Therefore, if low-order harmonic components of the magnetomotive force waveform and the permeability distribution of the rotor can be reduced and they can be made into sinewaves, the magnetic flux generated in the gap can be made into a sinewave, whereby loss due to harmonics can be reduced.

Next, in the rotating electric machine of the present embodiment, effects when there is no load will be described using Example 1, Comparative example 2, and Comparative example 3.

Figure 9:
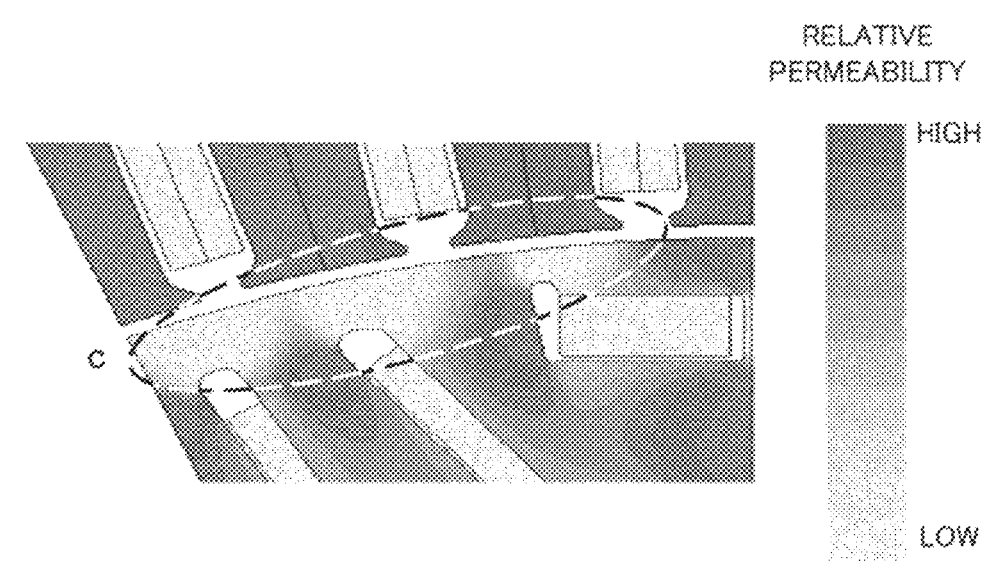
FIG. 9 is a contour diagram of a relative permeability in the rotating electric machine in Example 1 according to embodiment 1.
Figure 10:
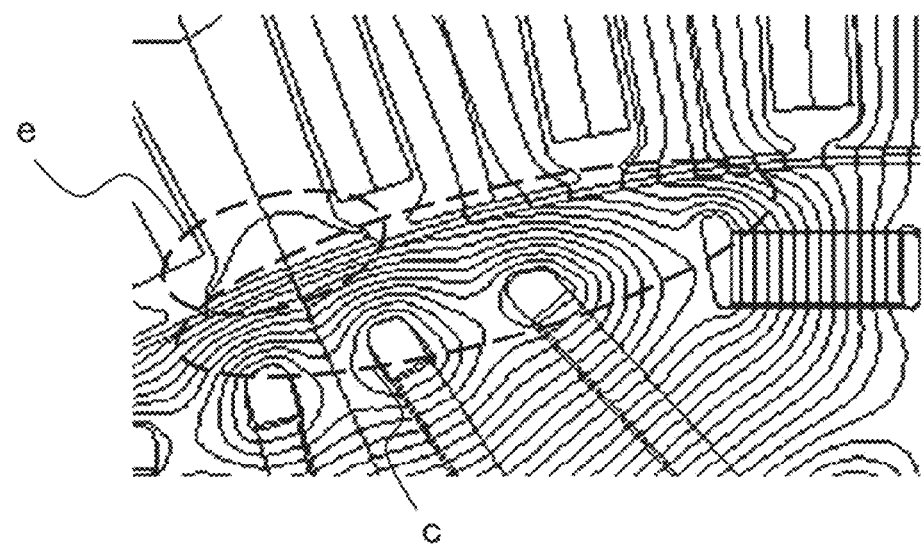
FIG. 10 shows magnetic flux lines in the rotating electric machine in Example 1 according to embodiment 1.

FIG. 9 is a contour diagram of a relative permeability when there is no load in the rotating electric machine in Example 1 according to the present embodiment. FIG. 10 shows magnetic flux lines in the rotating electric machine in Example 1. FIG. 10 shows magnetic flux lines of an armature magnetic flux obtained by magnetic flux separation between the armature magnetic flux and a magnet magnetic flux from the magnetic flux density shown in FIG. 9, using frozen permeability. FIG. 9 and FIG. 10 show results of simulations using the magnetic field analysis program, and parameters in Example 1 used for the simulation are as described above.

Figure 11:
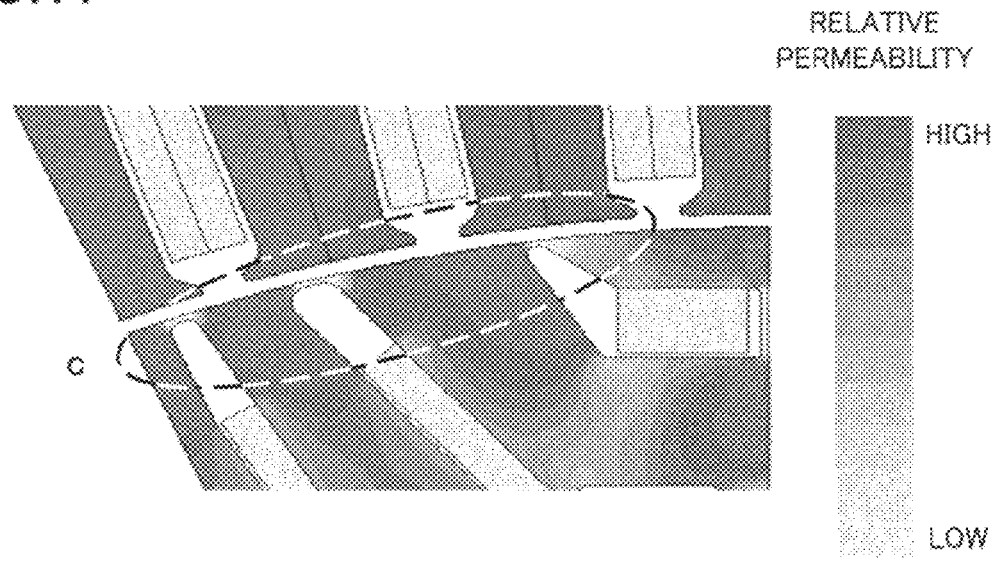
FIG. 11 is a contour diagram of a relative permeability in a rotating electric machine in Comparative example 2 according to embodiment 1.
Figure 12:
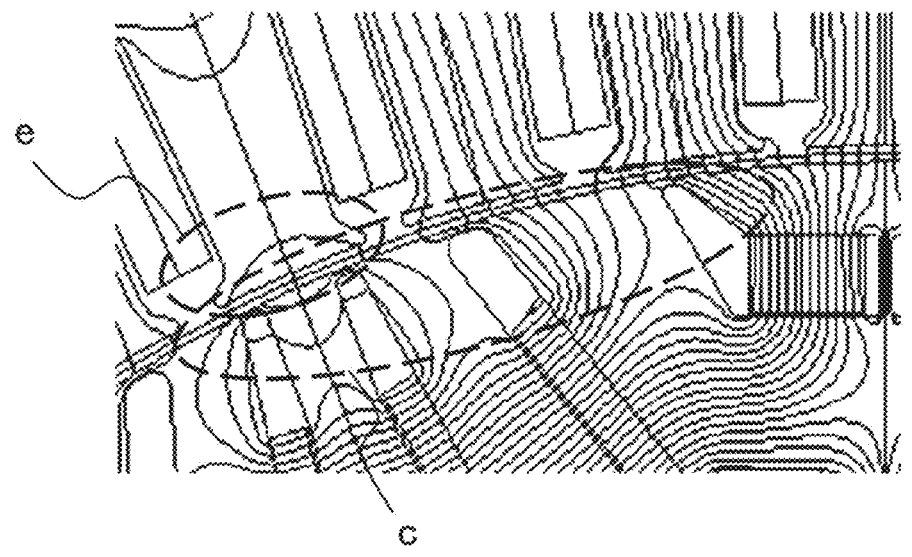
FIG. 12 shows magnetic flux lines in the rotating electric machine in Comparative example 2 according to embodiment 1.

FIG. 11 is a contour diagram of a relative permeability when there is no load in the rotating electric machine in Comparative example 2 according to the present embodiment. FIG. 12 shows magnetic flux lines in the rotating electric machine in Comparative example 2. FIG. 12 shows magnetic flux lines of an armature magnetic flux obtained by magnetic flux separation between the armature magnetic flux and a magnet magnetic flux from the magnetic flux density shown in FIG. 11, using frozen permeability. FIG. 11 and FIG. 12 show results of simulations using the magnetic field analysis program. Parameters in Comparative example 2 used in the simulation are as follows. Values regarding the condition 1 were θ1=67.5°, θ2=18.5°, and 63=8.3°. Values regarding the condition 2 were A=0.3 mm, B=0.3 mm, C=0.3 mm, W1=1.8 mm, W2=4.0 mm, and W3=6.5 mm. Thus, in Comparative example 2, θ1>θ2>θ3 is satisfied, i.e., the condition 1 is satisfied, but B+C<W3, A+B<W2, and 2×A<2×W1 are satisfied, i.e., the condition 2 is not satisfied.

Figure 13:
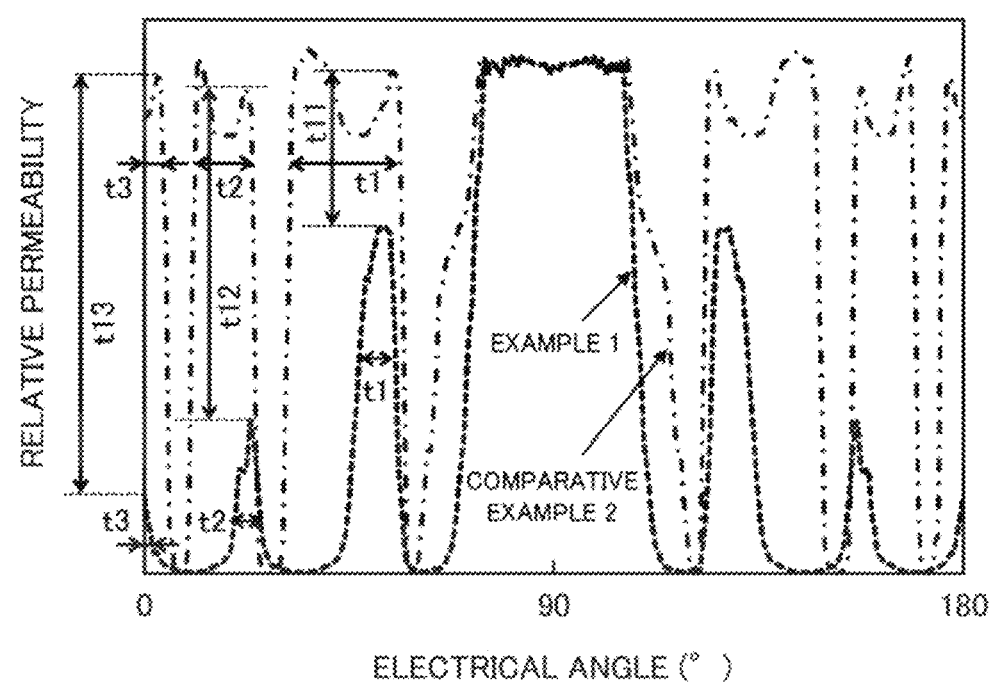
FIG. 13 is a characteristic graph showing a permeability distribution at an outer circumferential surface of a rotor of the rotating electric machine in Example 1 and Comparative example 2 according to embodiment 1.
Figure 14:
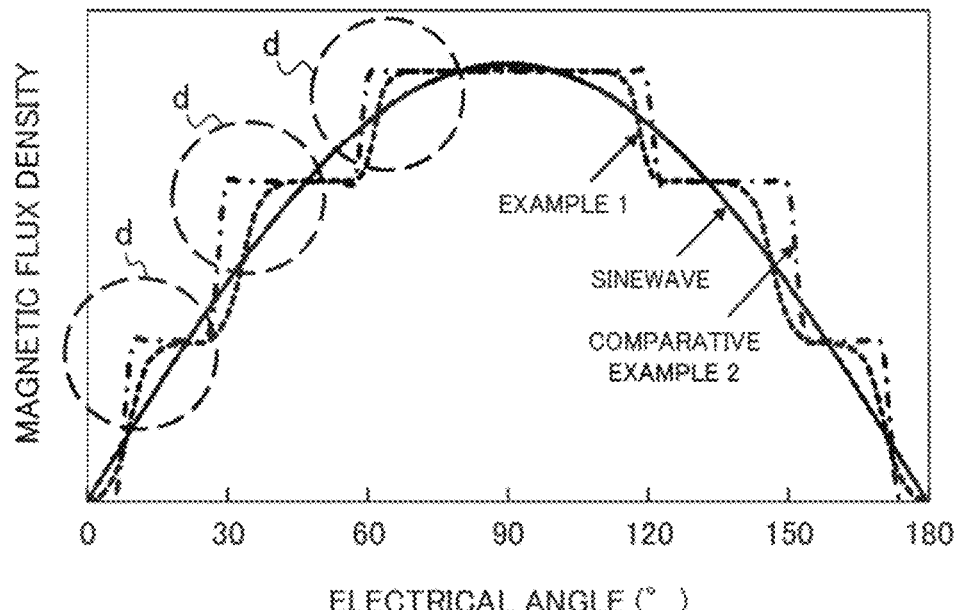
FIG. 14 is a characteristic graph showing a magnetic flux density distribution generated in a gap in the rotating electric machine in Example 1 and Comparative example 2 according to embodiment 1.

FIG. 13 is a characteristic graph showing a permeability distribution at the outer circumferential surface of the rotor of the rotating electric machine in Example 1 and Comparative example 2 according to the present embodiment. FIG. 14 is a characteristic graph showing a magnetic flux density distribution in the radial direction generated in the gap between the stator and the rotor in the rotating electric machine in Example 1 and Comparative example 2 according to the present embodiment.

As shown in a specific part c in FIG. 9, in Example 1, an area where the permeability is low is present at the surface of the rotor core 21, but as shown in the specific part c in FIG. 11, in Comparative example 2, such an area where the permeability is low is not present and the permeability at the surface of the rotor core 21 is high. Therefore, comparing FIG. 10 and FIG. 12, it is found that, while a magnet magnetic flux flows at the surface of the rotor core 21 on the gap side in Example 1, such a magnet magnetic flux is smaller in Comparative example 2. This is because, in the rotor core in Comparative example 2, flow of the magnet magnetic flux is restricted due to the narrowed bridge width. Such a narrow-bridge-width structure as in Comparative example 2 is a structure adopted in the conventional IPMSM. As a result, as shown in FIG. 13, the widths (t1, t2, t3) of three peaks which are present in an electrical angle range of 0 to 90° and where the permeability is high, are greater in Comparative example 2 than in Example 1. In addition, the heights of the three peaks are also greater in Comparative example 2 than in Example 1. For example, the height of the first peak indicated by the peak width t1 is greater in Comparative example 2 than in Example 1 by t11, the height of the second peak indicated by the peak width t2 is greater in Comparative example 2 than in Example 1 by t12, and the height of the third peak indicated by the peak width t3 is greater in Comparative example 2 than in Example 1 by t13. Further, as indicated by specific parts d in FIG. 14, a waveform which is present in an electrical angle range of 0 to 90° and where the magnetic flux density changes stepwise is more gradual in Example 1 than in Comparative example 2. That is, the magnetic flux density in Example 1 has a waveform closer to a sinewave, than the magnetic flux density in Comparative example 2.

In Example 1, parts where the magnetic flux density waveform is gradual at the specific parts d in FIG. 14 are focused on. In the specific part c in FIG. 10 of the surface of the rotor core 21 corresponding to the position where the magnetic flux density waveform is gradual, it is found that magnetic flux lines of the permanent magnets include magnetic flux lines that pass through the bridges and then are interlinked with the stator core 11, and magnetic flux lines that are short-circuited inside the rotor core 21. In addition, in the specific part c in FIG. 9, it is found that the permeability at the surface of the rotor core 21 is low. From the above, it is found that the rotor core 21 in the specific part c in FIG. 10 is magnetically saturated. Therefore, in order to make the magnetic flux density waveform gradual, it is necessary that magnetic saturation is caused by a magnet magnetic flux short-circuited inside the rotor core 21 and a magnet magnetic flux that passes through the bridges in the specific part c of the surface of the rotor core 21 and then is interlinked with the stator core 11.

The maximum magnetic flux that is outputted from the permanent magnets 23 of the rotor 20 is determined by the magnetic-pole-layer intervals W1, W2, W3. Regarding magnet magnetic flux outputted from the permanent magnets 23, the path through which the magnet magnetic flux flows from the rotor core 21 to the stator core 11 changes depending on the relationship between the magnetic-pole-layer intervals and the bridge widths. Regarding the rotor core in which the bridge widths are narrow so that the condition 2 is not satisfied as in Comparative example 2, the magnet magnetic flux in the specific part c in FIG. 12 is focused on. As shown in FIG. 12, in Comparative example 2, a magnetic flux passing through the bridges and a magnetic flux short-circuited in the rotor core 21 are present in a small amount of approximately one line per magnetic-pole layer, and most of the magnetic fluxes are directly inter-linked with the stator core 11. Therefore, in Comparative example 2, as shown in the specific part c in FIG. 11, the permeability of the rotor core 21 is high and only areas close to the bridges are magnetically saturated.

In contrast, in Example 1 in which the condition 2 is satisfied, as shown in FIG. 10, it is found that a magnet magnetic flux of the permanent magnet in each magnetic-pole layer passes through the bridge of another magnetic-pole layer and then is interlinked with the stator core 11. Thus, in the specific part c in FIG. 9, the permeability is radially reduced toward the gap from the flux barrier on the gap side of each magnetic-pole layer, so that the area indicated by the specific part c in the rotor core 21 is magnetically saturated.

From the above, it is necessary that the condition 2 having the relational expressions B+C>W3, A+B>W2, and 2A>2W1 is satisfied, in order to cause magnetic saturation in the specific part c of the surface of the rotor core 21. In the rotor in Example 1 which satisfies the condition 2, the surface of the rotor core 21 is magnetically saturated, whereby the magnetic flux density waveform generated in the gap becomes gradual. Then, at the positions corresponding to the parts where the magnetic flux density waveform becomes gradual, as shown in FIG. 13, the heights and the widths in the permeability distribution become smaller than in Comparative example 2. Thus, as shown in FIG. 14, it is found that, in the rotor in Example 1, the magnetic flux density waveform becomes closer to a sinewave as compared to Comparative example 2. As a result, the rotating electric machine having the rotor in Example 1 which satisfies the condition 2 can reduce harmonics.

In the rotating electric machines in Example 1 and Comparative example 2, W1<W2<W3 is satisfied. In the rotating electric machine in Comparative example 3, the condition of W1<W2<W3 is not satisfied.

Figure 15:
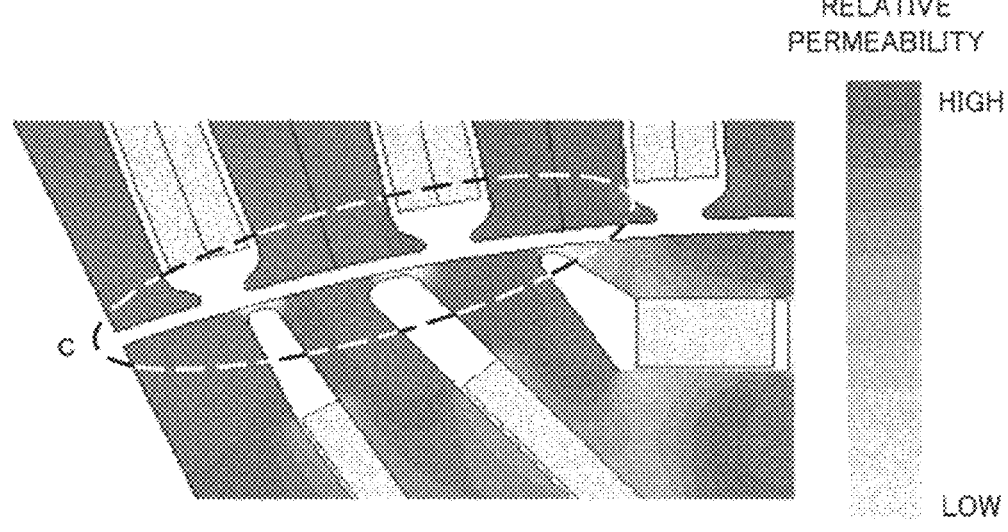
FIG. 15 is a contour diagram of a relative permeability in a rotating electric machine in Comparative example 3 according to embodiment 1.
Figure 16:
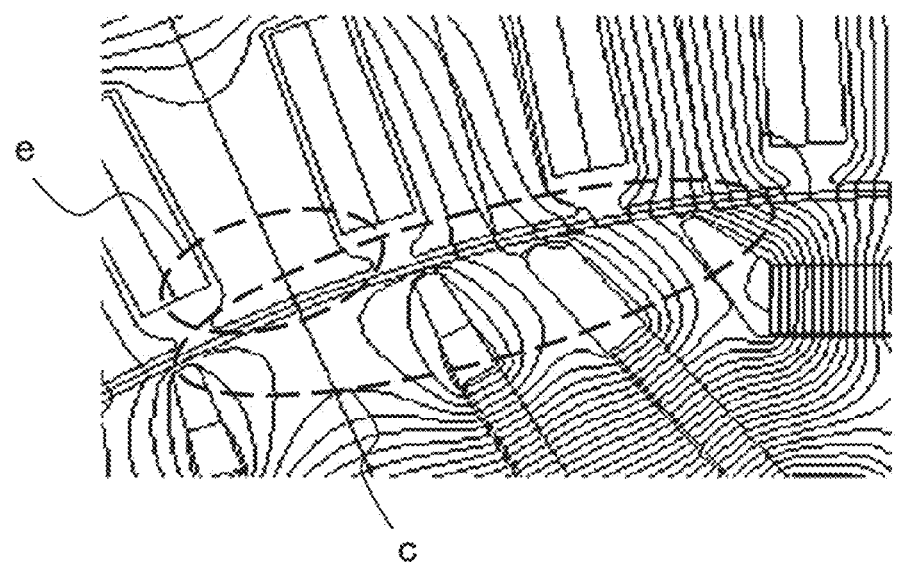
FIG. 16 shows magnetic flux lines in the rotating electric machine in Comparative example 3 according to embodiment 1.

FIG. 15 is a contour diagram of a relative permeability when there is no load in the rotating electric machine in Comparative example 3 according to the present embodiment. FIG. 16 shows magnetic flux lines in the rotating electric machine in Comparative example 3. FIG. 16 shows magnetic flux lines of an armature magnetic flux obtained by magnetic flux separation between the armature magnetic flux and a magnet magnetic flux from the magnetic flux density shown in FIG. 15, using frozen permeability. FIG. 15 and FIG. 16 show results of simulations using the magnetic field analysis program. Parameters in Comparative example 3 used in the simulation are as follows. Values regarding the condition 1 were θ1=67.5°, θ2=18.5°, and θ3=8.3°. Values regarding the condition 2 were A=0.3 mm, B=0.3 mm, C=0.3 mm, W1=5.5 mm, W2=3.8 mm, and W3=3.5 mm. Therefore, in Comparative example 3, θ1>θ2>θ3 is satisfied, i.e., the condition 1 is satisfied, but B+C<W3, A+B<W2, and 2×A<2×W1 are satisfied, i.e., the condition 2 is not satisfied. In addition, W1>W2>W3 is satisfied, i.e., the condition of W1<W2<W3 is not satisfied.

Figure 17:
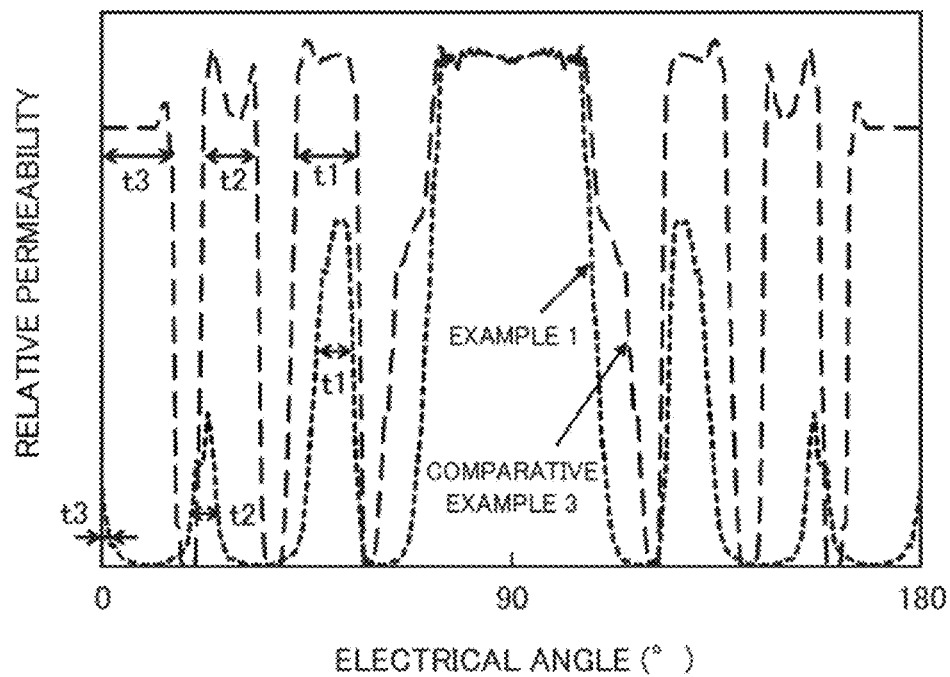
FIG. 17 is a characteristic graph showing a permeability distribution at an outer circumferential surface of the rotor of the rotating electric machine in Example 1 and Comparative example 3 according to embodiment 1.
Figure 18:
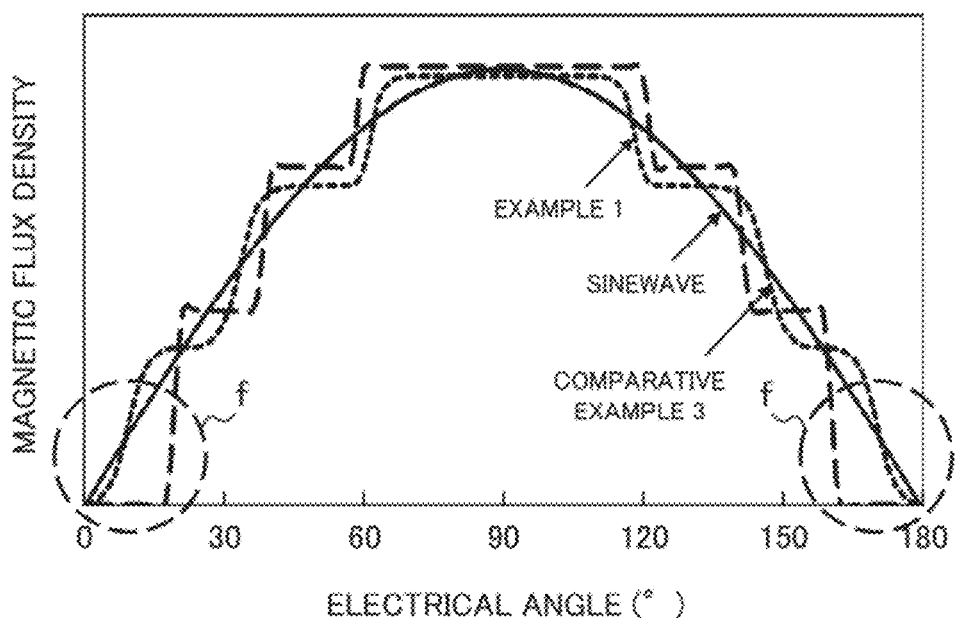
FIG. 18 is a characteristic graph showing a magnetic flux density distribution generated in the gap in the rotating electric machine in Example 1 and Comparative example 3 according to embodiment 1.

FIG. 17 is a characteristic graph showing a permeability distribution at the outer circumferential surface of the rotor of the rotating electric machine in Example 1 and Comparative example 3 according to the present embodiment. FIG. 18 is a characteristic graph showing a magnetic flux density distribution in the radial direction generated in the gap between the stator and the rotor in the rotating electric machine in Example 1 and Comparative example 3 according to the present embodiment.

As shown in the specific part c in FIG. 9, in Example 1, an area where the permeability is low is present at the surface of the rotor core 21, but as shown in the specific part c in FIG. 15, in Comparative example 3, such an area where the permeability is low is not present and the permeability at the surface of the rotor core 21 is high. Therefore, comparing FIG. 10 and FIG. 16, it is found that, while a magnet magnetic flux flows at the surface of the rotor core 21 on the gap side in Example 1, such a magnet magnetic flux is smaller in Comparative example 3. In addition, as shown in a specific part e in FIG. 10, in Example 1, a magnetic flux line is interlinked with the tooth of the stator core 11, but as shown in the specific part e in FIG. 16, in Comparative example 3, such a magnetic flux line is not present. Such a structure in which W1 is great as in Comparative example 3 is a structure adopted in the conventional IPMSM in order to improve a torque characteristic.

As shown in FIG. 17, the widths (t1, t2, t3) of three peaks which are present in an electrical angle range of 0 to 90° and where the permeability is high, are greater in Comparative example 3 than in Example 1. In addition, the heights of the three peaks are also greater in Comparative example 3 than in Example 1. Further, in Example 1, t1>t2>t3 is satisfied, but in Comparative example 3, t3 is the greatest. Thus, in the permeability distribution, it is found that the width of the area where the permeability is high at the q-axis part is the second greatest next to the width of the area where the permeability is high at the d-axis part. Further, as shown in specific parts f in FIG. 18, in Comparative example 3, the magnetic flux density is almost zero at parts where the magnetic poles are switched, i.e., in electrical angle ranges of 0 to 20° and 160 to 180°. This is because W1 becomes great so that the magnet magnetic flux no longer passes through these areas. On the other hand, in the rotating electric machine in Example 1 which satisfies W1<W2<W3, as shown in the specific parts f, the magnetic flux density distribution has a waveform close to a sinewave. Thus, it is found that satisfying W1<W2<W3 is preferable.

Figure 19:
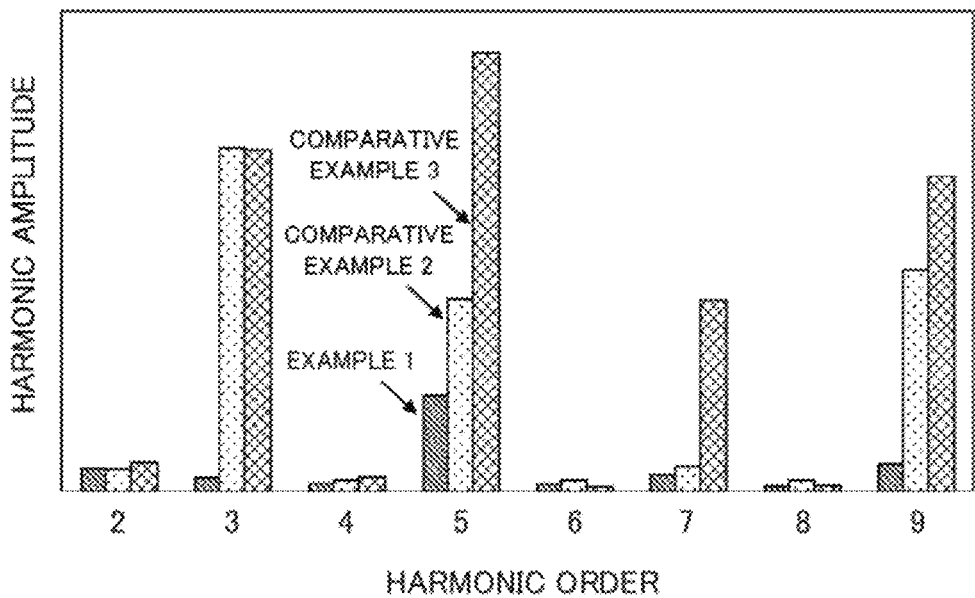
FIG. 19 is a characteristic graph showing a harmonic amplitude with respect to a harmonic order when a magnetic flux density waveform generated in the gap is subjected to frequency decomposition in the rotating electric machine according to embodiment 1.

FIG. 19 is a characteristic graph showing a harmonic amplitude with respect to a harmonic order when a magnetic flux density waveform generated in the gap between the stator and the rotor of the rotating electric machine is subjected to frequency decomposition, in Example 1, Comparative example 2, and Comparative example 3 according to the present embodiment.

As shown in FIG. 19, in the rotating electric machine in Example 1, for all the harmonic orders, harmonic components are reduced to be equal to or smaller than those in Comparative example 2 and Comparative example 3. Thus, it is found that the widths and the heights in the permeability can be controlled as shown in FIG. 13 by satisfying B+C>W3, A+B>W2, and 2×A>2×W1 in the condition 2. In addition, it is found that the widths in the permeability can be adjusted as shown in FIG. 17 by satisfying the relationship of W1<W2<W3. By satisfying these conditions, it is possible to bring the shape of the permeability distribution at the rotor core surface close to a sinewave. Further, it is also possible to bring the magnetomotive force waveform based on the magnet magnetic flux close to a sinewave.

Figure 20:
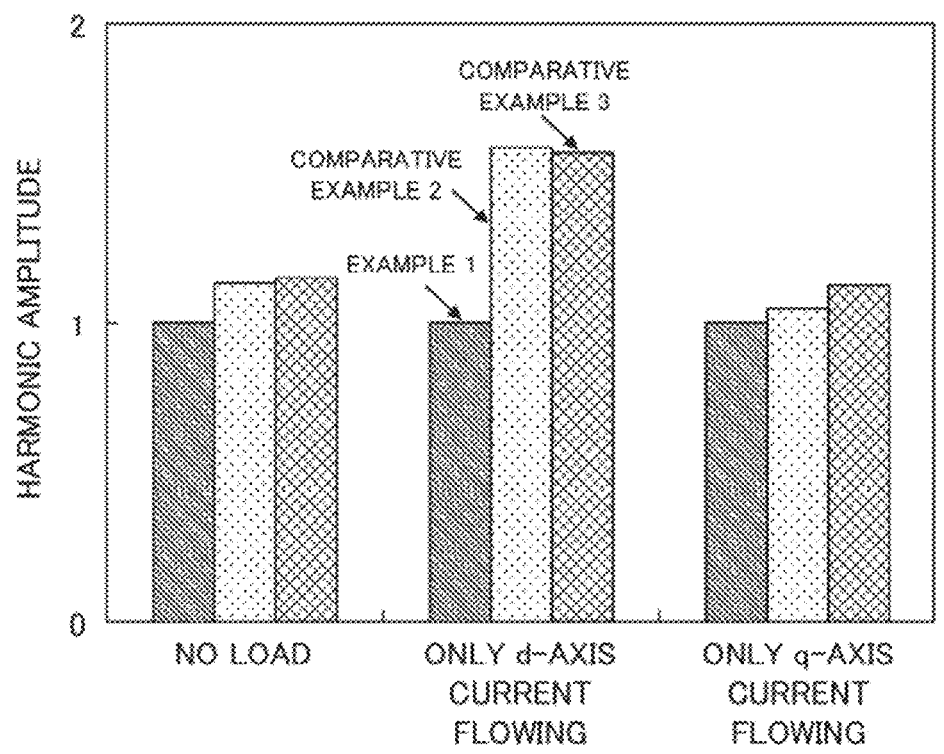
FIG. 20 is a characteristic graph showing loss when there is no load, when only d-axis current flows, and when only q-axis current flows, in the rotating electric machine according to embodiment 1.

FIG. 20 is a characteristic graph showing loss when there is no load, when only d-axis current flows, and when only q-axis current flows, in the rotating electric machine in Example 1, Comparative example 2, and Comparative example 3 according to the present embodiment. FIG. 20 shows relative values where loss in the rotating electric machine in Example 1 is defined as 1. As shown in FIG. 20, it is found that, in the rotating electric machine in Example 1, loss is small in all the conditions. In particular, when only d-axis current flows, loss is significantly reduced as compared to Comparative example 2 and Comparative example 3. This is an effect based on the fact that the permeability distribution is made close to a sinewave and the magnetic flux density waveform of the rotor generated in the gap is made close to a sinewave in the rotating electric machine in Example 1.

As described above, in the rotating electric machine of the present embodiment, the relationship of θ1>θ2>θ3 in the condition 1 and the relationship of B+C>W3, A+B>W2, and 2×A>2×W1 in the condition 2 are satisfied at the same time, whereby iron loss due to harmonics can be reduced.

In the rotating electric machine of the present embodiment, the pair of magnet slots in the magnetic-pole layer 221 at the farthest position from the rotary shaft have a V shape with an opening angle of 180°. That is, the angle between the d axis and a line parallel to the magnetic-flux output surface of the permanent magnet 23 inserted in the magnet slot 22 in the magnetic-pole layer 221 is a right angle. As long as the relationship of the condition 1 is satisfied, the pair of magnet slots in the magnetic-pole layer 221 may have an opening angle smaller than 180°.

In the rotating electric machine of the present embodiment, it is preferable that W1<W2<W3 is satisfied, as described in Comparative example 3. When this condition is satisfied, the magnet magnetic flux more readily passes through the q-axis part.

In a sectional view perpendicular to the rotary shaft of the rotating electric machine of the present embodiment, where the length of the magnetic-flux output surface of the permanent magnet 23 is defined as a magnet width and the length in a direction perpendicular to the magnetic-flux output surface of the permanent magnet 23 is defined as a magnet thickness, it is preferable that, in one magnetic pole, the permanent magnets 23 in the magnetic-pole layers become smaller in the magnet width and greater in the magnet thickness as the magnetic-pole layers become closer to the gap, i.e., farther from the rotary shaft. The permanent magnet 23 in the magnetic-pole layer located close to the gap is most influenced by a demagnetization field. The demagnetization force of the permanent magnet is proportional to the magnet thickness. When the thickness of the permanent magnet 23 in the magnetic-pole layer located close to the gap is set to be greatest, the demagnetization resistance against the demagnetization field due to d-axis current flowing at the time of field weakening can be increased.

The shapes of the flux barriers in the rotating electric machine of the present embodiment will be described. As shown in FIG. 4, the d-axis-side flux barrier 223b of the magnet slot in the magnetic-pole layer 223 is divided into two areas by an extension plane extended from the magnetic-flux output surface of the permanent magnet 23 inserted in the magnet slot. The width in a direction perpendicular to the extension plane of the flux barrier area that is farther from the d axis, of the two divided flux barrier areas, is defined as a d-axis radially outer width H1, and the width in the direction perpendicular to the extension plane of the flux barrier area closer to the d axis is defined as a d-axis radially inner width H2. In the rotating electric machine of the present embodiment, it is preferable that H1<H2 is satisfied. In the rotating electric machine configured as described above, a magnetic flux generated from the permanent magnet 23 is configured such that a component short-circuited by the permanent magnet 23 is reduced and a component extending radially outward increases. In addition, the d-axis inductance can be reduced, whereby reluctance torque which increases in proportion to the difference between the q-axis inductance and the d-axis inductance can be increased. Further, since the d-axis-side flux barrier 223b is formed to be large, void areas of the rotor core 21 are increased, so that the weight of the rotor core 21 is reduced and the withstanding strength against centrifugal force is also improved. It is preferable that not only the magnetic-pole layer 223 has the above shape of the d-axis-side flux barrier but also the other magnetic-pole layers have similar shapes of d-axis-side flux barriers.

Embodiment 2

Figure 21:
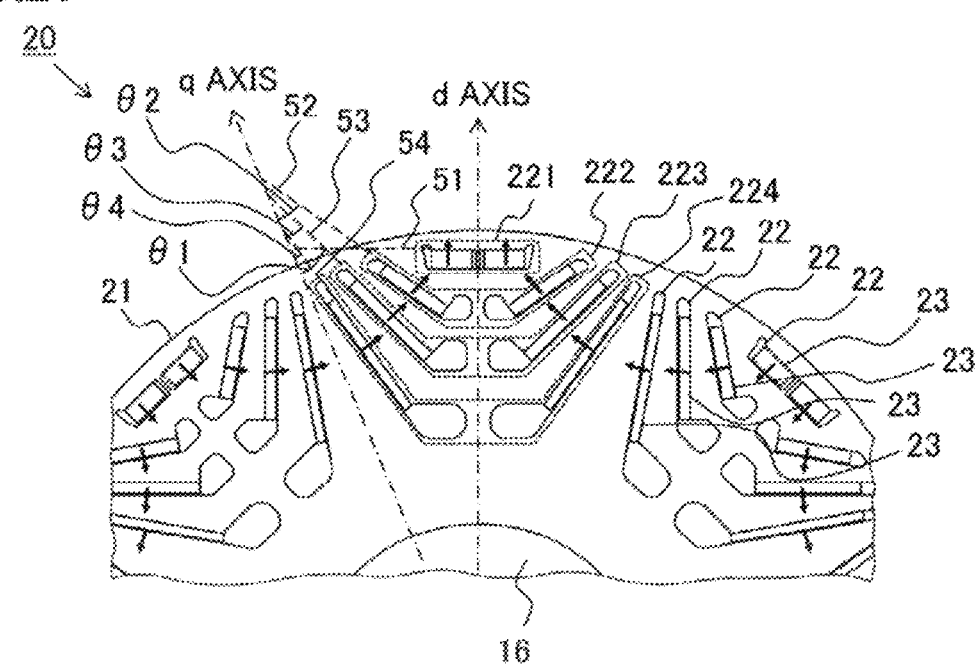
FIG. 21 is an enlarged sectional view of a rotor according to embodiment 2.

FIG. 21 is an enlarged sectional view of a rotor according to embodiment 2. FIG. 21 is a sectional view along a plane perpendicular to the rotary shaft. In the rotor 20 of the present embodiment, one magnetic pole includes four magnetic-pole layers 221, 222, 223, 224. The structure of each magnetic-pole layer is the same as that described in embodiment 1.

As shown in FIG. 21, a line parallel to the magnetic-flux output surface of the permanent magnet 23 in the magnetic-pole layer 221 is defined as a line 51. A line parallel to the magnetic-flux output surface of the permanent magnet 23 in the magnetic-pole layer 222 is defined as a line 52. A line parallel to the magnetic-flux output surface of the permanent magnet 23 in the magnetic-pole layer 223 is defined as a line 53. A line parallel to the magnetic-flux output surface of the permanent magnet 23 in the magnetic-pole layer 224 is defined as a line 54. Then, an angle on the rotary shaft side between the q axis and the line 51 is defined as a magnetic-pole-layer angle θ1, an angle on the rotary shaft side between the q axis and the line 52 is defined as a magnetic-pole-layer angle θ2, an angle on the rotary shaft side between the q axis and the line 53 is defined as a magnetic-pole-layer angle θ3, and an angle on the rotary shaft side between the q axis and the line 54 is defined as a magnetic-pole-layer angle 94. The rotor 20 of the present embodiment is configured so as to satisfy a relationship of θ1>82>θ3>θ4. In other words, the magnetic-pole-layer angles in one magnetic pole are set so as to become smaller as the magnetic-pole layers become closer to the rotary shaft.

Figure 22:
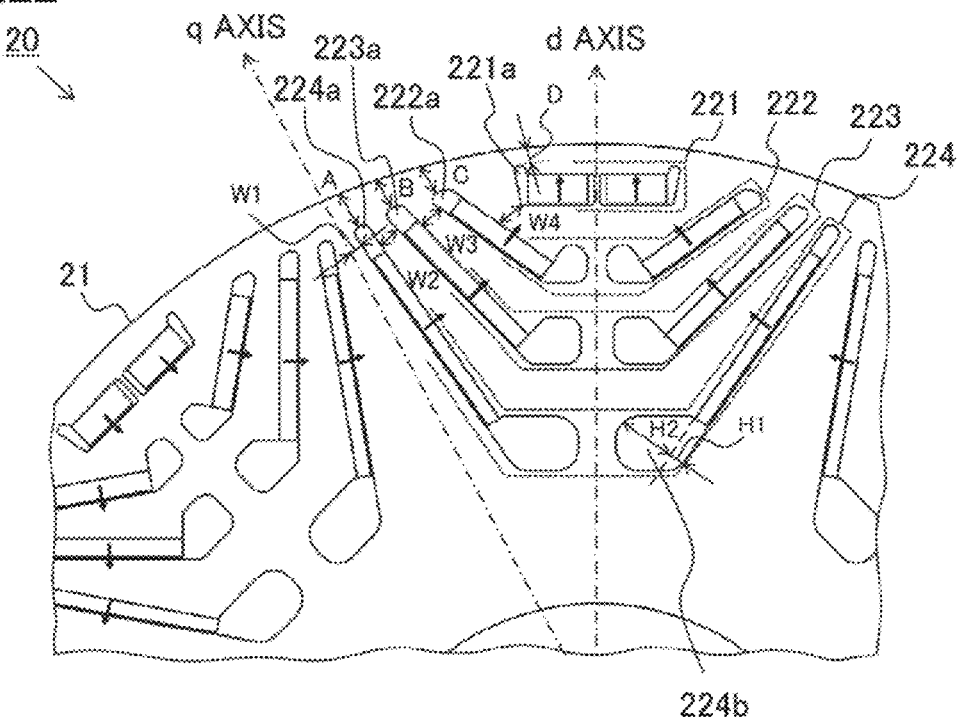
FIG. 22 is an enlarged sectional view of the rotor according to embodiment 2.

FIG. 22 is an enlarged sectional view of the rotor according to the present embodiment. FIG. 22 is a sectional view more enlarged than in FIG. 21. In FIG. 22, the shortest distance between the gap-side flux barrier 221a in the magnetic-pole layer 221 and the outer circumferential surface of the rotor core 21 is defined as a bridge width D, the shortest distance between the gap-side flux barrier 222a in the magnetic-pole layer 222 and the outer circumferential surface of the rotor core 21 is defined as a bridge width C, the shortest distance between the gap-side flux barrier 223a in the magnetic-pole layer 223 and the outer circumferential surface of the rotor core 21 is defined as a bridge width B, and the shortest distance between a gap-side flux barrier 224a in the magnetic-pole layer 224 and the outer circumferential surface of the rotor core 21 is defined as a bridge width A. In addition, the shortest distance between the magnetic-pole layer 221 and the magnetic-pole layer 222 is defined as a magnetic-pole-layer interval W4, the shortest distance between the magnetic-pole layer 222 and the magnetic-pole layer 223 is defined as a magnetic-pole-layer interval W3, the shortest distance between the magnetic-pole layer 223 and the magnetic-pole layer 224 is defined as a magnetic-pole-layer interval W2, and the shortest distance between the magnetic-pole layer 224 and the q axis is defined as a magnetic-pole-layer interval W1. The rotor 20 of the present embodiment is configured so as to satisfy a relationship of C+D>W4, B+C>W3, A+B>W2, and 2×A>2×W1. In other words, each magnetic-pole-layer interval is set to be smaller than the sum of the bridge widths of the magnetic-pole layers adjacent to each other.

In the rotating electric machine including the rotor configured as described above, iron loss due to harmonics can be reduced as in embodiment 1.

In the present embodiment, it is preferable that W4>W3>W2>W1 is satisfied. When this condition is satisfied, the magnet magnetic flux more readily passes through the q-axis part.

In the present embodiment, a d-axis-side flux barrier 224*b* of the magnet slot in the magnetic-pole layer 224 is divided into two areas by an extension plane extended from the magnetic-flux output surface of the permanent magnet 23 inserted in the magnet slot. The width in a direction perpendicular to the extension plane of the flux barrier area that is farther from the d axis, of the two divided flux barrier areas, is defined as a d-axis radially outer width H1, and the width in the direction perpendicular to the extension plane of the flux barrier area closer to the d axis is defined as a d-axis radially inner width H2. In the rotating electric machine of the present embodiment, it is preferable that H1<H2 is satisfied. In addition, it is preferable that the other magnetic-pole layers also have similar shapes. In the rotating electric machine configured as described above, a magnetic flux generated from the permanent magnet 23 is configured such that a component short-circuited by the permanent magnet 23 is reduced and a component extending radially outward increases. In addition, the d-axis inductance can be reduced, whereby reluctance torque which increases in proportion to the difference between the q-axis inductance and the d-axis inductance can be increased.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS

1 rotating electric machine
10 stator
11 stator core

12 stator coil
13 frame
14 bearing
15 bracket
16 rotary shaft
18 tooth
19 core back
20 rotor
21 rotor core
22 magnet slot
23 permanent magnet
51, 52, 53, 54 line
221, 222, 223, 224 magnetic-pole layer
221*a*, 222*a*, 223*a*, 224*a* gap-side flux barrier
222*b*, 223*b*, 224*b* d-axis-side flux barrier

The invention claimed is:

1. A rotor for a multi-layer V-shaped interior permanent magnet motor comprising a rotor core and a plurality of permanent magnets, the rotor to rotate about a rotary shaft, wherein
  in a cross-section perpendicular to the rotary shaft,
  one magnetic pole is formed by three or more magnetic-pole layers being arranged, each magnetic-pole layer being formed by a pair of magnet slots in a V shape opened radially outward from a center of the rotary shaft and the permanent magnets inserted in the magnet slots,
  each magnet slot has a magnet insertion portion in which the permanent magnet is inserted and flux barriers formed at both ends of the magnet insertion portion to prevent magnetic flux generated from the permanent magnet from returning to the permanent magnet without passing through a stator core,
  where a magnetic pole center of the one magnetic pole is defined as a d axis, a direction electrically perpendicular to the d axis is defined as a q axis, and an angle on the rotary shaft side between the q axis and a line parallel to a magnetic-flux output surface of the permanent magnet inserted in the magnet slot in each magnetic-pole layer is defined as a magnetic-pole-layer angle, the magnetic-pole-layer angles in the one magnetic pole become smaller as the magnetic-pole layers become closer to the rotary shaft, and
  where a shortest distance from the flux barrier on a radially outer side of the magnet slot to an outer circumferential surface of the rotor core is defined as a bridge width and a shortest distance between the magnetic-pole layers with permanent magnets adjacent to each other is defined as a magnetic-pole-layer interval, the magnetic-pole-layer interval is smaller than a sum of the bridge widths of the magnetic-pole layers adjacent to each other, wherein
  a shortest distance between the q axis and the flux barrier on the radially outer side of the magnetic-pole layer closest to the rotary shaft is smaller than the magnetic-pole-layer intervals in the magnetic pole.
2. The rotor according to claim 1, wherein
  the magnetic-pole-layer intervals in the one magnetic pole become smaller as they approach the rotary shaft.
3. The rotor according to claim 1, wherein
  the bridge widths in the one magnetic pole become greater as the magnetic-pole layers become closer to the rotary shaft.
4. The rotor according to claim 1, wherein
  an angle between the d axis and the line parallel to the magnetic-flux output surface of the permanent magnet inserted in the magnet slot in the magnetic-pole layer farthest from the rotary shaft is a right angle.

5. The rotor according to claim 1, wherein where a length of a magnetic-flux output surface of the permanent magnet is defined as a magnet width and a length in a direction perpendicular to the magnetic-flux output surface of the permanent magnet is defined as a magnet thickness, in the one magnetic pole, the permanent magnets in the magnetic-pole layers become smaller in the magnet width and greater in the magnet thickness as the magnetic-pole layers become farther from the rotary shaft.

6. The rotor according to claim 1, wherein in the flux barrier on a radially inner side of the magnet slot in at least one of the magnetic-pole layers, where the flux barrier is divided into two areas by an extension plane extended from the magnetic-flux output surface of the permanent magnet inserted in the magnet slot, a width in a direction perpendicular to the extension plane of the flux barrier area that is divided by the extension plane and is farther from the d axis is defined as a d-axis radially outer width, and a width in the direction perpendicular to the extension plane of the flux barrier area that is divided by the extension plane and is closer to the d axis is defined as a d-axis radially inner width, the d-axis radially outer width is smaller than the d-axis radially inner width.

7. A rotating electric machine comprising: a stator including a stator core and a stator coil; and the rotor according to claim 1, which is rotatably provided at the stator with a gap therebetween.

\*   \*   \*   \*   \*